Patented July 23, 1929.

UNITED STATES PATENT OFFICE.

HARRY P. KIMBER, OF DETROIT, MICHIGAN, ASSIGNOR TO EARL HOLLEY, OF DETROIT, MICHIGAN.

COATING FOR MOLDS.

No Drawing.     Application filed June 3, 1927. Serial No. 196,397.

This invention relates to an improved coating for the protection of the surface of a metal mold exposed to the erosion of molten metal.

Specifically the object of this invention is to protect a cast iron surface against the action of molten metal.

Coatings have been used heretofore which satisfactorily protected the surface of a cast iron mold, especially when cast iron was poured therein. Owing to the fact that they were hydroscopic, some of these coatings deteriorated when they were not in use, and some of them absorbed carbon dioxide from the air, and all of them were less refractory and less tenacious than desired.

Specifically this is true of the coating described in the patent to Meloche, #1,453,593. The reason for this being that the preferable form of the coating disclosed therein is made with a water soluble binder having a relatively strong base (sodium silicate) which retains water very tenaciously when applied to a mold, even though heated to a relatively high degree, the water being retained as though in a weak chemical combination. Further, this substance appears to absorb $CO_2$ from the atmosphere.

I have discovered that if I substitute for the sodium silicate binder, described in that patent as the preferred binder, sodium chromate, and if I substitute for the fire clay, described in that patent as the preferred refractory, chrome ore, and if I make a wash with water and these ingredients in a similar way in which the wash described in the Meloche patent is made, not only will the coating when applied to a heated mold, be more permanent under the conditions of actual operation, that is to say when metal is cast into a mold frequently, but that a relatively thicker, and therefore more refractory, coating can be applied, and thus, regardless of the specific refractory qualities of the chrome ore itself, the refractory property of the resulting coating is greater (being thicker). For the same reasons the heat insulation property is greater.

Finally, whereas with sodium silicate it is desirable to use as little as possible of the binder, owing to its hydroscopic and poor refractory qualities, no such limitation prevents a liberal percentage of the sodium chromate being used.

The specific application of the invention I have found most satisfactory is as follows:—

I take from 20 to 40 parts, by weight, of sodium chromate and 30 to 60 parts, by weight of powdered chrome ore and mix with 500 parts of water. Actually the sodium chromate is dissolved in the water, and the powdered chrome ore added while being vigorously stirred. This forms a thicker wash, when using the minimum figures for the sodium chromate and the chrome ore, than that disclosed in the Meloche patent. When using the maximum figures for the sodium chromate and the chrome ore the wash is much thicker, being thick enough to approach the consistency of a thin paste.

The mold surface to which it is applied is smooth but not polished, the surface left by a sand blast being the degree of roughness which I have found ideal. The temperature of the mold is raised to a point considerably above the boiling point of water, and the wash, or thin paste as the case may be, applied with a bristle brush. Repeated applications of this paste result in a coating having a substantial thickness. I have found that with this coating I am less limited as to thickness, and can apply a coating of over 1/32", which is much thicker than I have found possible with the Meloche coating.

I have also discovered that the surface produced by building up a coating is one to which lampblack will not adhere so tenaciously as to the Meloche coating. That is to say, it is one from which lampblack can be easily brushed or blown. This is important, because in the actual operation of the molds it is desirable to present a fresh coating of lampblack to the molten iron each time a casting is made. In fact it is one of the steps in the Meloche process that the lampblack be removed between each casting and a fresh coating applied to prevent the lampblack building up. With this chrome-chromate coating I have discovered that the old lampblack is much more easily removed, and on the other hand the new lampblack adheres sufficiently so as to offer the necessary protection to the molten metal when it first enters the mold. The reason being that the surface produced has a velvety appearance.

The increased thickness and this improved surface of the refractory coating results in a more uniform product in the castings cast therein. The surface of the castings are improved and the mold does not have to be preheated to such a degree as it does with the coating described in the Meloche patent to avoid having cold shots and gas pockets in the castings first made in the molds, before the molds have reached their working temperature (over 700°F.).

I have found that if I substitute sodium tungstate for sodium chromate I get results only slightly inferior to those which I obtain with sodium chromate. The big step forward, I believe, is due, however, to the substitution of the chrome ore for fire clay. Chrome ore is adapted to withstand a much higher temperature than the fire clay of the Meloche patent, therefore this coating is specially valuable in the production of steel castings poured at approaching 3000°F., whereas the Meloche coating is more adapted for the production of gray iron castings which are poured at 300°–500° F. lower temperature.

There are three other members of the chromium group, namely tungsten, molybdenum, and uranium (I have discovered that sodium tungstate, for example, may be substituted for sodium chromate) which may be substituted for the chromium in both the sodium chromate and the chrome ore.

I consider that potassium is the equivalent of the sodium in salts, and therefore potassium chromate would be the equivalent of sodium chromate. The same is true of lithium, but sodium salts are so much more available and cheaper than the potassium and lithium salts that I prefer to use sodium chromate, and for these reasons I prefer to use the specific combination of a quantity of chrome ore with a relatively smaller quantity of sodium chromate.

In the Meloche patent referred to the soluble binder was kept at a very small percentage as compared to the quantity of refractory used, the reason being that the sodium silicate is hydroscopic and also is a poor refractory. Owing to the action of carbon dioxide in the air, the sodium silicate-fire clay coating is destroyed when exposed to the air for any length of time. Sodium chromate is a much more refractory compound and is not susceptible to moisture and $CO_2$ in the atmosphere, and therefore the percentage of binder used need not be so limited, and the possibility of using a much larger percentage makes this a much more satisfactory binder for the refractory compound.

Sodium chromate as a refractory, though not as good as chrome ore, is almost as good as fire clay itself. The sodium silicate binder is satisfactory at lower temperatures, but at high temperatures, such as are met with when making malleable iron and steel castings, the sodium chromate is vastly superior both as a binder and as a refractory.

What I claim is:—

1. A coating for protecting metal molds, consisting of an inert refractory insulating material, and a soluble chromate acting as a binder only for the refractory insulating material.

2. An insulating refractory wash for coating metal molds, consisting of chrome ore powder suspended in water, in which soluble chromate is dissolved.

3. An insulating refractory wash for coating metal molds, consisting of chrome ore powder suspended in water, in which sodium chromate is dissolved.

4. A mold for metal castings, comprising a cast iron body having a mold cavity and a refractory lining for the surface of the mold cavity, consisting of a mixture of refractory material and a binder of water soluble chromate.

5. A coating for protecting metal molds, consisting of from 20 to 40 parts of sodium chromate dissolved in 500 parts of water in which are suspended from 30 to 60 parts of powdered chrome ore.

6. A coating for protecting metal molds, consisting of from 20 to 40 parts of soluble chromate dissolved in 500 parts of water in which are suspended from 30 to 60 parts of powdered chrome ore.

7. A coating for protecting metal molds, consisting of from 20 to 40 parts of a soluble salt, the acid radical of which is derived from the chromium group, said salt being dissolved in 500 parts of water in which are suspended from 30 to 60 parts by weight of a powdered oxide of the chromium group.

8. A cast iron mold for the production of castings, said mold being lined with a smooth adherent coating of chrome ore and a binder formed with a soluble salt, the acid radical of which is formed from a member of the chromium group.

In testimony whereof I affix my signature.

HARRY P. KIMBER.